(12) United States Patent
Mao et al.

(10) Patent No.: US 10,630,198 B2
(45) Date of Patent: Apr. 21, 2020

(54) VOLTAGE CONVERTER

(71) Applicant: TRIDONIC GMBH & CO KG, Dornbirn (AT)

(72) Inventors: Egbert Mao, Guangdong (CN); Scotty Zhong, Guangdong (CN); Steven Chen, Guangdong (CN); David Zhang, Guangdong (CN)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/469,705

(22) PCT Filed: Dec. 5, 2017

(86) PCT No.: PCT/CN2017/114578
§ 371 (c)(1),
(2) Date: Jun. 14, 2019

(87) PCT Pub. No.: WO2018/113513
PCT Pub. Date: Jun. 28, 2016

(65) Prior Publication Data
US 2019/0356237 A1      Nov. 21, 2019

(30) Foreign Application Priority Data

Dec. 22, 2016  (CN) .......................... 2016 1 1198701

(51) Int. Cl.
*H02M 7/217*   (2006.01)
*H02M 1/44*    (2007.01)
(Continued)

(52) U.S. Cl.
CPC ............. *H02M 7/217* (2013.01); *H02M 1/44* (2013.01); *H02M 1/126* (2013.01); *H02M 7/125* (2013.01); *H02M 2001/123* (2013.01)

(58) Field of Classification Search
CPC . H02M 2001/123; H02M 1/126; H02M 7/125
(Continued)

(56) References Cited

U.S. PATENT DOCUMENTS

| | | | |
|---|---|---|---|
| 2010/0141040 A1* | 6/2010 | Chapel | H01R 13/6683 307/80 |
| 2011/0148204 A1* | 6/2011 | DiMarco | H02J 9/062 307/65 |

(Continued)

FOREIGN PATENT DOCUMENTS

| | | |
|---|---|---|
| CN | 101232170 | 7/2008 |
| CN | 201466987 | 5/2010 |

(Continued)

OTHER PUBLICATIONS

International Search Report dated Mar. 8, 2018 in parent PCT Application PCT/CN2017114578.
European search report dated Oct. 24, 2019 in co-pending European patent application 17884790.1.

*Primary Examiner* — Gary A Nash
(74) *Attorney, Agent, or Firm* — Andrus Intellectual Property Law

(57) ABSTRACT

An embodiment of the present application provides a voltage conversion device configured to convert an inputted alternating voltage into a direct voltage or current, the voltage conversion device including at least a first voltage connector and a second voltage connector, where the alternating voltage is fed to the voltage conversion device via either the first voltage connector or the second voltage connector, the voltage conversion device further including: an electromagnetic filter unit; a conversion unit; a determination unit configured to determine which one of the first voltage connector and the second voltage connector is used to feed the alternating voltage into the voltage conversion device; a control unit controlling the conversion unit based on a determination result of the determination unit such that (Continued)

the direct voltage or current outputted by the conversion unit corresponds to the determination result, wherein the determination unit is electrically connected the first voltage connector and the second voltage connector. This application can determine a voltage connector for feeding via a simple circuit and can perform corresponding control to output a corresponding direct voltage or current.

7 Claims, 2 Drawing Sheets

(51) Int. Cl.
*H02M 7/12* (2006.01)
*H02M 1/12* (2006.01)

(58) Field of Classification Search
USPC ...... 307/64, 65; 315/174; 363/47, 48, 78, 89
See application file for complete search history.

(56) References Cited

U.S. PATENT DOCUMENTS

| | | |
|---|---|---|
| 2013/0164016 A1 | 6/2013 | Inukai |
| 2014/0044447 A1* | 2/2014 | Jeong ................ G03G 15/80 399/69 |
| 2014/0070744 A1* | 3/2014 | Becerra .............. H02M 1/4266 318/400.24 |
| 2014/0183956 A1* | 7/2014 | Wang .................... H02J 9/062 307/64 |
| 2015/0035367 A1* | 2/2015 | Fang ..................... H02J 9/061 307/64 |

FOREIGN PATENT DOCUMENTS

| | | |
|---|---|---|
| CN | 201536273 | 7/2010 |
| CN | 101982017 | 2/2011 |
| DE | 102008016752 | 10/2009 |
| EP | 1286455 | 2/2003 |

* cited by examiner

-- PRIOR ART --

VOLTAGE CONVERTER

CROSS REFERENCE TO RELATED APPLICATIONS

The present application is the U.S. national stage application of international application PCT/CN2017/114578 filed Dec. 5, 2017, which international application was published on Jun. 28, 2019 as International Publication WO 2018/113513 A1. The international application claims priority to China Patent Application 201611198701.6 filed Dec. 22, 2016.

TECHNICAL FIELD

The present invention relates to the field of voltage conversion technology, particularly to a voltage conversion device.

BACKGROUND ART

The voltage conversion device is able to convert an inputted alternating voltage to a direct voltage and output the same to electrical appliances. In a typical usage scenario, the voltage conversion device can be, for example, an electronic ballast which can convert a power network voltage in a form of an alternating voltage into a direct voltage and output to a light emitting diode (LED) or other electrical appliances.

The voltage conversion device can have a plurality of voltage connectors, and the alternating voltage is fed to the voltage conversion device via different voltage connectors. Since the direct voltage outputted by the voltage conversion device varies, one voltage conversion device can be applied to electrical appliances with different powers.

Patent Literature 1 (CN101982017A) discloses a voltage conversion device, and FIG. 1 is a schematic diagram of the voltage conversion device of the Patent Literature 1. As shown in FIG. 1, the voltage conversion device 1 has voltage connectors 2 and 3, and the alternating voltage fed from the voltage connector 2 or 3 sequentially goes through and is processed by an electromagnetic filter 4, a bridge rectifier 5, a direct voltage intermediate circuit 6, a half bridge inverter 7 and a resonant circuit 8 to become a direct voltage, and is outputted from output terminals 9 and 10 into an electrical equipment 11.

In FIG. 1, the voltage conversion device 1 further has a transformer T, a resistor R and a control unit 12. When the alternating voltage is fed from the voltage connector 3, a current flows through a primary winding W of the transformer T to generate an induced current in a secondary winding W' and generate a voltage difference across the resistor R. When the control unit 12 detects a voltage difference across the resistor R, it can be determined that the alternating voltage is fed from the voltage connector 3, and a control signal corresponding to the voltage connector 3 is outputted to the half bridge inverter 7 to control the two switches in the half bridge inverter 7 to be alternately turned on, so that the voltage conversion device 1 outputs a corresponding direct voltage. On the contrary, when the control unit 12 detects that no voltage difference is generated across the resistor R, it can be determined that the alternating voltage is fed from the voltage connector 2, and a control signal corresponding to the voltage connector 2 is outputted to the half bridge inverter 7 to control the two switches in the half bridge inverter 7 to be alternately turned on, so that the voltage conversion device 1 outputs a corresponding direct voltage.

In prior art, other methods may be employed to cause the voltage conversion device to output different direct voltages and currents, for example, switching control on the secondary side of the voltage conversion device, or switching control on the primary side of the voltage conversion device, etc.

It should be noted that the above introduction to technical background is merely for the purpose of a clear and complete description of the technical solutions of the present application and for a better understanding by those of ordinary skill in the art. The above technical solutions should not be considered to be well-known to those of ordinary technicians simply because these solutions are to set forth in the section of background art of the present application.

SUMMARY OF INVENTION

The inventor of the present application has found that in the prior art, in order to output different direct currents by the voltage conversion device, the commonly used control circuits are complicated. For example: the circuit structure of Patent Literature 1 is complicated; when using the secondary side of the voltage conversion device to switch the control, the switching status needs to be fed back to the primary side, which increases the circuit complexity; when using the primary side of the voltage conversion device to switch the control, a two ways terminal and a jumper need to be set on the primary side, which also increases the circuit complexity.

An embodiment of the present application provides a voltage conversion device which can use a simple circuit to determine a voltage connector for feeding and can perform a corresponding control to output a corresponding direct voltage.

According to one aspect of the embodiment of the present application, there is provided a voltage conversion device configured to convert an inputted alternating voltage into a direct voltage or current, the voltage conversion device including at least a first voltage connector and a second voltage connector, where the alternating voltage is fed to the voltage conversion device via either the first voltage connector or the second voltage connector, the voltage conversion device further including:

an electromagnetic filter unit configured to electromagnetically filter an inputted alternating voltage;

a conversion unit configured to convert the voltage which has been electromagnetically filtered by the electromagnetic filter unit into a direct voltage or current and output the same;

a determination unit configured to determine which one of the first voltage connector and the second voltage connector is used to feed the alternating voltage into the voltage conversion device; and a control unit controlling the conversion unit based on a determination result of the determination unit such that the direct voltage or current outputted by the conversion unit corresponds to the determination result, wherein the determination unit is electrically connected the first voltage connector and the second voltage connector.

According to another aspect of the embodiment of the present application, the determination unit has a first switch element Q1 and a second switch element Q2, when the alternating voltage is fed to the voltage conversion device via the first voltage connector, both of the first switch element Q1 and the second switch element Q2 are turned off; and when the alternating voltage is fed to the voltage conversion device via the second voltage connector, the first switch element Q1 is periodically turned on and the second switch element Q2 is kept turned on.

According to another aspect of the embodiment of the present application, the determination unit further has a first diode D1 and a second diode D2, wherein the first diode D1 and the second diode D2 are connected in parallel between the first voltage connector and the second voltage connector, When the alternating voltage is fed to the voltage conversion device via the first voltage connector, both of the first diode D1 and the second diode D2 are turned off; and when the alternating voltage is fed to the voltage conversion device via the second voltage connector, the first diode D1 and the second diode D2 are alternately conducting forward in accordance with a flow of the alternating current.

According to another aspect of the embodiment of the present application, the first switch element Q1 is bipolar transistor, a base of the bipolar transistor is electrically connected to the second voltage connector via a first resistor R1 and an emitter of the bipolar transistor is electrically connected to the first voltage connector.

According to another aspect of the embodiment of the present application, a collector of the bipolar transistor is grounded via the second resistor R4.

According to another aspect of the embodiment of the present application, when the alternating voltage is fed to the voltage conversion device via the second voltage connector, a voltage difference across the second resistor R4 causes the second switch element Q2 is turned on.

According to another aspect of the embodiment of the present application, the determination unit further has a capacitor C1, and when the alternating voltage is fed to the voltage conversion device via the second voltage connector, the capacitor C1 maintains the voltage difference across the second resistor R4.

According to another aspect of the embodiment of the present application, the second switch element Q2 is a metal oxide semiconductor field effect (MOS-FET) transistor, and a gate of the metal oxide semiconductor field effect (MOS-FET) transistor and an ungrounded end of the second resistor R4 are electrically connected.

An advantageous effect of the embodiments of the present application is: a simple circuit can be used to determine the voltage connector for feeding and to perform a corresponding control to output a corresponding direct voltage or current.

In the following description and the attached drawings, specific embodiments of the present invention are disclosed in detail and manners in which the principle of the present invention may be employed are shown clearly. It should be understood that the embodiments of the present invention are not thus limited in scope. The embodiments of the present invention include a plurality of variations, modifications, and equivalents within the gist and scope of the appended claims.

Features described and/or illustrated with respect to one embodiment may be used in one or more other embodiments in the same or similar manner, in combination with, or in place of, features in other embodiments.

It should be emphasized that the term "comprise/include" used herein refers to the existence of a feature, a whole piece, a step or a component, but does not exclude the existence or addition of one or more other features, whole pieces, steps or components.

BRIEF DESCRIPTION OF THE DRAWINGS

The attached drawings included herein constitute a part of the specification and are used to provide a further understanding to the embodiments of the present invention and to illustrate the embodiments of the present invention, and illustrate, in combination with the written description, the principles of the present invention. Obviously, the attached drawings in the following description are merely some of the embodiments of the present invention, and those of ordinary skill in the art can obtain other drawings according to these attached drawings without involving any creative work. In the attached drawings.

SPECIFIC EMBODIMENTS

The aforementioned and other features of the present invention will be apparent through the following description with reference to the attached drawings. The specification and the attached drawings disclose specific embodiments of the present invention, which illustrate part of the embodiments in which the principles of the present invention may be employed. It should be understood that the present invention is not limited to the described embodiments. On the contrary, the present invention includes all modifications, variations and equivalents falling in the scope of the appended claims.

Embodiment 1

Embodiment 1 of this application provides a voltage conversion device configured to convert an inputted alternating voltage into a direct voltage or current and then output the same. In this embodiment, the direct voltage or current output by the voltage conversion device may be provided to an electrical appliance, such as a light-emitting diode (LED).

Figure 1:
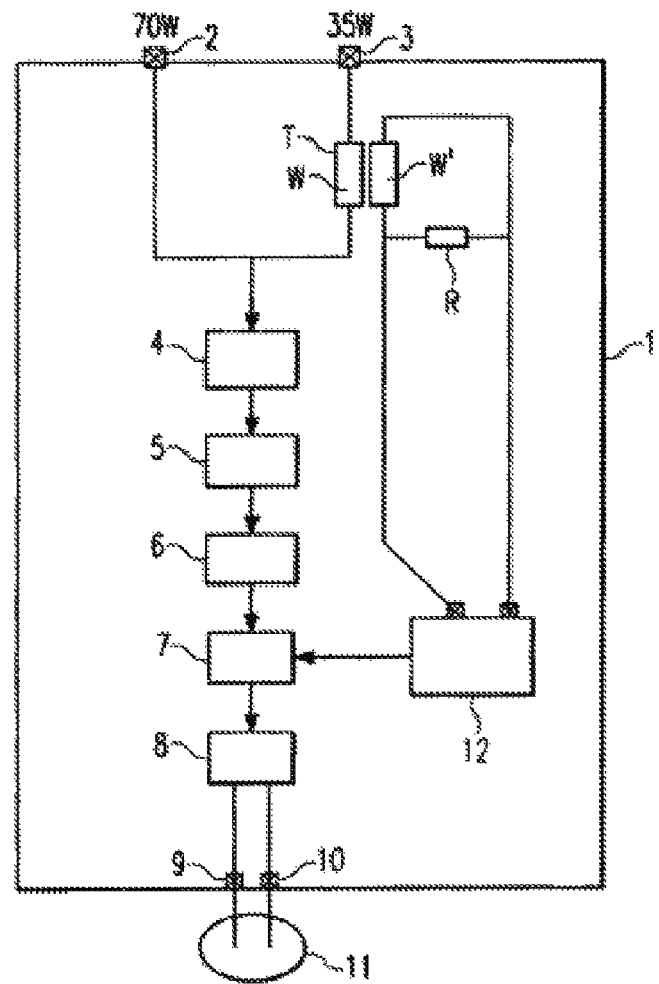
FIG. 1 is a schematic diagram of the voltage conversion device of the Patent Literature 1.
Figure 2:
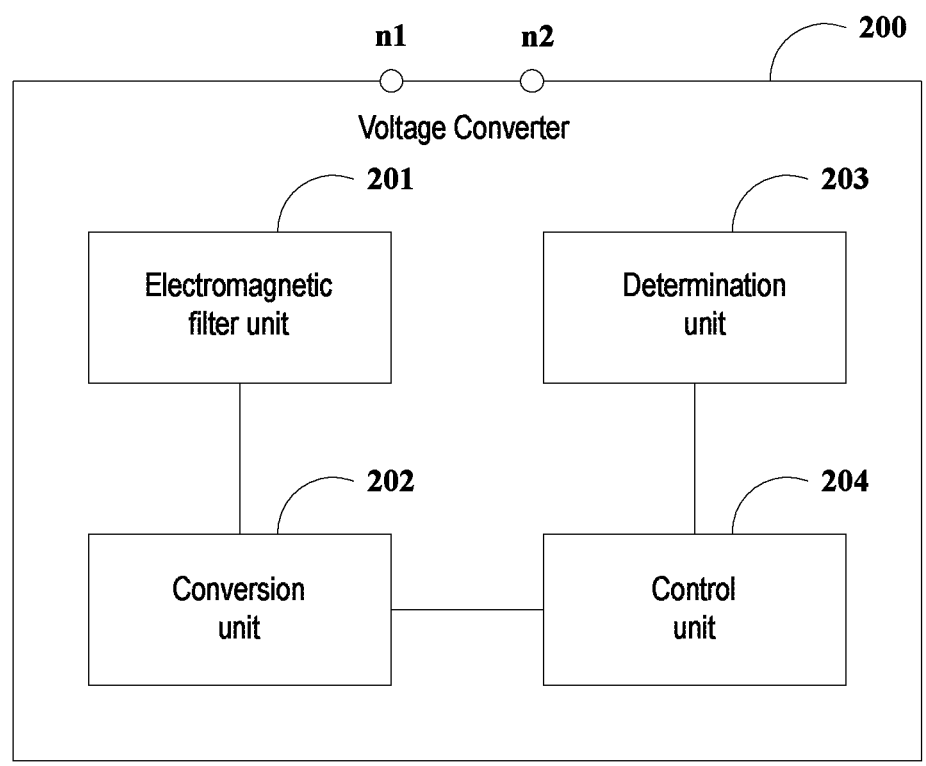
FIG. 2 is a schematic diagram of a voltage conversion device of Embodiment 1 of the present application.

FIG. 2 is a schematic diagram of the voltage conversion device of the embodiment. In FIG. 2, the voltage conversion device 200 may include: a first voltage connector n1, a second voltage connector n2, an electromagnetic filter unit 201, a conversion unit 202, a determination unit 203 and a control unit 204.

In this embodiment, the alternating voltage can be fed to the voltage conversion device 200 via the first voltage connector n1 or the second voltage connector n2; the electromagnetic filter unit 201 is configured to electromagnetically filter the inputted alternating voltage; the conversion unit 202 is configured to convert the voltage which has been electromagnetically filtered by the electromagnetic filter unit 201 into a direct voltage or current and output the same; the determination unit 203 is configured to determined which one of the first voltage connector n1 and the second voltage connector n2 is used to feed the alternating voltage into the voltage conversion device 200; the control unit 204 controls the conversion unit 202 based on a determination result of the determination unit 203 such that direct voltage or current outputted by the conversion unit 202 corresponds the determination result. The determination unit 203 is electrically connected to the first voltage connector n1 and is electrically connected to the second voltage connector n2 in this embodiment.

Since the determination unit 203 is electrically connected to the first voltage connector n1 and is electrically connected to the second voltage connector n2 in this embodiment, it is possible to determine the voltage connector for feeding by using a simple circuit and to perform a corresponding control to output a corresponding direct voltage or current. Compared to the prior art, this embodiment can reduce the cost.

Regarding the description of the electromagnetic filter unit 201 in this embodiment, reference can be made to the prior art.

The conversion unit 202 in this embodiment may have the same structure as the prior art. For example, the conversion unit 202 can have a bridge rectifier, a direct voltage intermediate circuit, a half bridge inverter and a resonant circuit, etc. The half bridge inverter can have two alternating switches. The control unit 204 controls the duty ratio of the two alternating switches to make the conversion unit 202 output different direct voltages or currents. Also, the conversion unit 202 can have other structures which will not be described again in this embodiment because reference can be made to the prior art.

In the embodiment, the control unit 204 can control according to the determination result of the determination unit 203. For example, the control unit 204 can be connected with the determination unit 203 to receive a signal output from the determination unit 203 and can also control correspondingly according to the signal output from the determination unit 203. The control unit 204 can be an integrated circuit (IC) in this embodiment, for example, an Application Specific Integrated Circuit (ASIC) or a microprocessor, etc.

Figure 3:
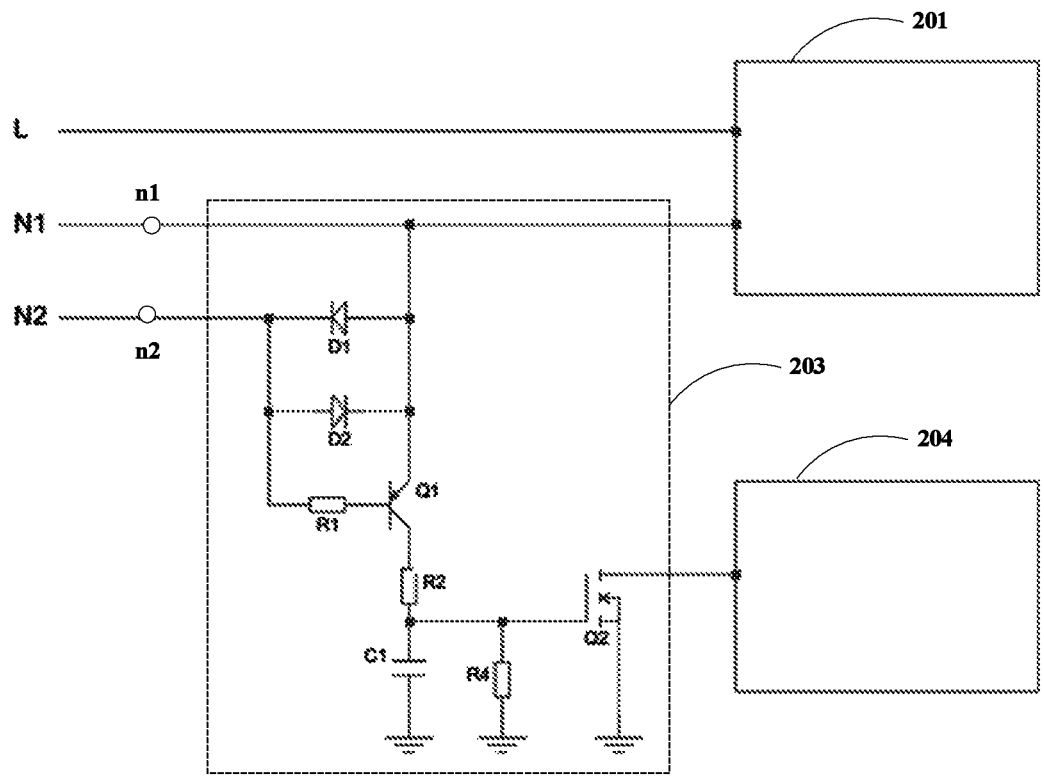
FIG. 3 is a schematic diagram of a determination unit of Embodiment 1 of the present application.

FIG. 3 is a schematic diagram of the determination unit 203 of this embodiment.

As shown in FIG. 3, the determination unit 203 may have a first switch element Q1 and a second switch element Q2. When the alternating voltage is fed to the voltage conversion device 200 via the first voltage connector n1, both of the first switch element Q1 and the second switch element Q2 are turned off. When the alternating voltage is fed to the voltage conversion device 200 via the second voltage connector n2, the first switch element Q1 is periodically turned on and the second switch element Q2 is kept turned on.

As shown in FIG. 3, the determination unit 203 may further have a first diode D1 and a second diode D2, where the first diode D1 and second diode D2 can be connected in parallel between the first voltage connector n1 and the second voltage connector n2. When the alternating voltage is fed to the voltage conversion device 200 via the first voltage connector n1, both of the first diode D1 and the second diode D2 are turned off. When the alternating voltage is fed to the voltage conversion device 200 via the second voltage connector n2, the first diode D1 and the second diode D2 are alternately conducting forward in accordance with a flow of the alternating current.

As shown in FIG. 3 in this embodiment, the first switch element Q1 may be a bipolar transistor, for example, a PNP bipolar transistor. A base B of the bipolar transistor can be electrically connected to the second voltage connector n2 via the first resistor R1, and an emitter E of the bipolar transistor can be electrically connected to the first voltage connector n1.

As shown in FIG. 3, a collector C of the bipolar transistor may be grounded via the second resistor R4. When the alternating voltage is fed to the voltage conversion device 200 via the second voltage connector n1, the voltage difference across the second resistor R4 can turn on the second switch element Q2.

As shown in FIG. 3 in this embodiment, the second switch element Q2 can be a metal oxide semiconductor field effect (MOS-FET) transistor, and the gate of the second switch element Q2 and the ungrounded end of the second resistor R4 can be electrically connected. The drain of the second switch element Q2 can be connected with the control unit 204.

Furthermore, as shown in FIG. 3, the determination unit 203 may further have a capacitor C1, and when the alternating voltage is fed to the voltage conversion device via the second voltage connector, the capacitor C1 makes the voltage difference remain across the second resistor R4. For example, this capacitor C1 can be connected with the second resistor R4 in parallel.

In addition, as shown in FIG. 3, the determination unit 203 may also have a third resistor R2, and this third resistor R2 can be connected between the collector of the first switch element Q1 and the second resistor R4.

Furthermore, this embodiment can have more voltage connectors, and more determination units 203 can be set to determine whether an alternating voltage is fed from these voltage connectors.

Action of the determination unit 203 will be described below.

When the alternating voltage is fed into the voltage conversion device 200 via the first voltage connector n1, both the first diode D1 and the second diode D2 are cut off, that is, the base of the first switch element Q1 has no current flowing branch, which makes the first switch element Q1 cut off and therefore, the second switch element Q2 is turned off. The control unit 204 detects the cutoff of the second switch element Q2, and performs a control corresponding to the situation in which the alternating voltage is fed to the voltage conversion device 200 via the first voltage connector n1.

When the alternating voltage is fed to the voltage conversion device 200 via the second voltage connector n2, the first diode D1 and the second diode D2 are alternately conducting forward in accordance with the flow direction of the alternating current. Therefore, the action of the determination unit 203 is as follows:

In a certain half cycle of the alternating current, the first diode D1 is turned on, and the voltage difference between the emitter and the base of the first switch element Q1 is clamped by the first diode D1. Therefore, the first switch element Q1 is turned on during this half cycle in which D1 is turned on, and a current flows through the first switch element Q1. After the capacitor C1 is charged by the third resistor R2, the capacitor C1 stores a charge and a voltage difference is generated across the second resistor R4. This voltage difference is applied to the gate of the second switch element Q2, which causes the second switch element Q2 to stay turned on during this half cycle of the alternating current. The control unit 204 detects that the second switch element Q2 is turned on, and performs a control corresponding to the situation in which the alternating voltage is fed to the voltage conversion device 200 via the second voltage connector n2;

In the other half cycle of alternating current, the second diode D2 is turned on. This provide a path for the alternating voltage to enter the electromagnetic filter unit 201 via the second voltage connector n2. In this other half cycle, the first switch element Q1 is reverse-biased and is cut off, and does not charge the C1. However, since the C1 stores a charge which maintains the voltage difference across the second resistor R4, the second switch element Q2 is still turned on during this other half of the cycle. Therefore, the second switch element Q2 is kept turned on during the full cycle. The first switch element Q1 is turned on only during the half cycle in which the first diode D1 is conducting forward, and thus the first switch element Q1 is turned on periodically.

Furthermore, in FIG. 3, N1 and N2 can be respectively a neutral line connected with an alternating current power supply, and L can be a live line connected with the alternating current power supply.

Since the determination unit 203 is electrically connected to the first voltage connector n1 and is electrically connected to the second voltage connector n2 in this embodiment, it is possible to determine the voltage connector for feeding by using a simple circuit and to perform a corresponding control to output a corresponding direct voltage or current. Compared to the prior art, this embodiment can reduce the cost.

The present application has been described above with reference to specific embodiments. However, those of ordinary skill in the art should understand that the description is illustrative and is not intended to limit the protection scope of the present application. Various kinds of variations and modifications may be made to the present application by those of ordinary skill in the art based on the gist and principles of the present application, and these variations and modifications are also within the scope of the present application.

The invention claimed is:

1. A voltage conversion device configured to convert an inputted alternating voltage into a direct voltage or current, the voltage conversion device including at least a first voltage connector and a second voltage connector, where the alternating voltage is fed to the voltage conversion device via either the first voltage connector or the second voltage connector,
the voltage conversion device further including:
an electromagnetic filter unit configured to electromagnetically filter an inputted alternating voltage;
a conversion unit configured to convert the voltage which has been electromagnetically filtered by the electromagnetic filter unit into a direct voltage or current and output the same;
a determination unit configured to determine which one of the first voltage connector and the second voltage connector is used to feed the alternating voltage into the voltage conversion device; and
a control unit controlling the conversion unit based on a determination result of the determination unit such that the direct voltage or current outputted by the conversion unit corresponds to the determination result, wherein the determination unit is electrically connected the first voltage connector and the second voltage connector; and wherein,
the determination unit includes a first switch element Q1 and a second switch element Q2,
when the alternating voltage is fed to the voltage conversion device via the first voltage connector, both of the first switch element Q1 and the second switch element Q2 are turned off; and when the alternating voltage is fed to the voltage conversion device via the second voltage connector, the first switch element Q1 is periodically turned on and the second switch element Q2 is kept turned on.

2. The voltage conversion device according to claim 1, wherein,
the determination unit further has a first diode D1 and a second diode D2, wherein the first diode D1 and the second diode D2 are connected in parallel between the first voltage connector and the second voltage connector,
when the alternating voltage is fed to the voltage conversion device via the first voltage connector, both of the first diode D1 and the second diode D2 are turned off; and
when the alternating voltage is fed to the voltage conversion device via the second voltage connector, the first diode D1 and the second diode D2 are alternately conducting forward in accordance with a flow of the alternating current.

3. The voltage conversion device according to claim 2, wherein,
the first switch element Q1 is bipolar transistor, a base of the bipolar transistor is electrically connected to the second voltage connector via a first resistor R1 and an emitter of the bipolar transistor is electrically connected to the first voltage connector.

4. The voltage conversion device according to claim 3, wherein, a collector of the bipolar transistor is grounded via a second resistor R4.

5. The voltage conversion device according to claim 4, wherein, when the alternating voltage is fed to the voltage conversion device via the second voltage connector, a voltage difference across the second resistor R4 causes the second switch element Q2 turned on.

6. The voltage conversion device according to claim 5, wherein,
the determination unit further has a capacitor C1,
when the alternating voltage is fed to the voltage conversion device via the second voltage connector, the capacitor C1 maintains the voltage difference across the second resistor R4.

7. The voltage conversion device according to claim 5, wherein,
the second switch element Q2 is a metal oxide semiconductor field effect (MOS-FET) transistor, and a gate of the metal oxide semiconductor field effect (MOS-FET) transistor and an ungrounded end of the second resistor R4 are electrically connected.

* * * * *